United States Patent
MacKenzie et al.

(10) Patent No.: US 11,683,752 B2
(45) Date of Patent: Jun. 20, 2023

(54) CELLULAR TELECOMMUNICATIONS NETWORK

(71) Applicant: BRITISH TELECOMMUNICATIONS PUBLIC LIMITED COMPANY, London (GB)

(72) Inventors: Richard MacKenzie, London (GB); Douglas Fripp, London (GB); Arjun Parekh, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 17/304,298

(22) Filed: Jun. 17, 2021

(65) Prior Publication Data

US 2021/0400577 A1    Dec. 23, 2021

(30) Foreign Application Priority Data

Jun. 18, 2020 (GB) ..................................... 2009312

(51) Int. Cl.
*H04W 52/02* (2009.01)

(52) U.S. Cl.
CPC ... *H04W 52/0206* (2013.01); *H04W 52/0235* (2013.01); *H04W 52/0245* (2013.01)

(58) Field of Classification Search
CPC ......... H04W 52/0206; H04W 52/0235; H04W 52/0245
USPC ........................................................ 370/311
See application file for complete search history.

(56) References Cited

U.S. PATENT DOCUMENTS

| | | | |
|---|---|---|---|
| 8,903,402 B2 | 12/2014 | Guo et al. | |
| 9,215,629 B2 | 12/2015 | Hapsari et al. | |
| 9,301,105 B2 | 3/2016 | Kim et al. | |
| 9,392,420 B2 | 7/2016 | Fodor et al. | |

(Continued)

FOREIGN PATENT DOCUMENTS

| | | |
|---|---|---|
| CN | 102083145 A | 6/2011 |
| CN | 102149101 A | 8/2011 |

(Continued)

OTHER PUBLICATIONS

3GPP 36.420 v8.0.0 (Dec. 2007), "X2 General Aspects and Principals," Technical Specification, 3rd Generation Partnership Project, http://www.qtc.jp/3GPP/Specs/36420-800.pdf, (Release 8), Dec. 2007, 11 pages.

(Continued)

*Primary Examiner* — Gbemileke J Onamuti
(74) *Attorney, Agent, or Firm* — Patterson Thuente, P.A.

(57) ABSTRACT

This disclosure provides a method of operating a cellular telecommunications network, wherein the cellular telecommunications network includes a first transceiver providing a first access connection, a second transceiver providing a second access connection, and a third transceiver providing a third access connection, wherein the first and second transceivers are co-located, the method including determining that the third transceiver should enter energy saving mode; in response to the determination: causing reconfiguration of the first transceiver to reduce its transmission power, causing reconfiguration of the second transceiver so as to increase its transmit power of the second access connection and to compensate for the third transceiver.

13 Claims, 6 Drawing Sheets

(56) References Cited

U.S. PATENT DOCUMENTS

| | | |
|---|---|---|
| 9,439,137 B2 | 9/2016 | Kim et al. |
| 9,462,546 B2 | 10/2016 | Ohta et al. |
| 9,615,318 B2 | 4/2017 | Morper et al. |
| 9,961,687 B2 | 5/2018 | Kashiwase et al. |
| 9,998,982 B2 | 6/2018 | Horn et al. |
| 10,057,743 B2 | 8/2018 | Jabara et al. |
| 10,405,280 B2 | 9/2019 | Mackenzie et al. |
| 10,462,846 B2 | 10/2019 | Morrill et al. |
| 10,498,502 B2 | 12/2019 | Mildh et al. |
| 2009/0219888 A1 | 9/2009 | Chen et al. |
| 2010/0120447 A1 | 5/2010 | Anderson et al. |
| 2010/0157911 A1 | 6/2010 | Hegde et al. |
| 2010/0178912 A1 | 7/2010 | Gunnarsson et al. |
| 2010/0227623 A1 | 9/2010 | De Pasquale et al. |
| 2011/0190027 A1 | 8/2011 | Michel et al. |
| 2011/0274030 A1 | 11/2011 | Wang et al. |
| 2012/0002537 A1 | 1/2012 | Bao et al. |
| 2012/0026865 A1 | 2/2012 | Fan et al. |
| 2012/0108245 A1 | 5/2012 | Zhang et al. |
| 2012/0157095 A1 | 6/2012 | Fodor et al. |
| 2012/0236828 A1 | 9/2012 | Hapsari et al. |
| 2012/0244869 A1 | 9/2012 | Song et al. |
| 2012/0257495 A1 | 10/2012 | Schwarz et al. |
| 2012/0264418 A1 | 10/2012 | Lee et al. |
| 2012/0275315 A1 | 11/2012 | Schlangen et al. |
| 2013/0005340 A1 | 1/2013 | Drazynski et al. |
| 2013/0035033 A1 | 2/2013 | Sanneck et al. |
| 2013/0084873 A1 | 4/2013 | Sharony et al. |
| 2013/0095842 A1 | 4/2013 | Jia et al. |
| 2013/0130670 A1 | 5/2013 | Samdanis et al. |
| 2013/0150044 A1 | 6/2013 | Zhang et al. |
| 2013/0170435 A1 | 7/2013 | Dinan |
| 2013/0242720 A1 | 9/2013 | Chou |
| 2013/0260768 A1 | 10/2013 | Guo et al. |
| 2014/0018057 A1 | 1/2014 | Yu et al. |
| 2014/0038593 A1 | 2/2014 | Kim et al. |
| 2014/0050135 A1 | 2/2014 | Zhang et al. |
| 2014/0051437 A1 | 2/2014 | Diachina et al. |
| 2014/0071891 A1 | 3/2014 | Zhou et al. |
| 2014/0071943 A1 | 3/2014 | Lee et al. |
| 2014/0092765 A1 | 4/2014 | Agarwal et al. |
| 2014/0126562 A1 | 5/2014 | Gunnarsson et al. |
| 2014/0187234 A1 | 7/2014 | Chou |
| 2014/0187236 A1 | 7/2014 | Chiang et al. |
| 2014/0269547 A1 | 9/2014 | Valliappan et al. |
| 2014/0286218 A1 | 9/2014 | Park et al. |
| 2014/0364114 A1 | 12/2014 | Zhao |
| 2015/0063136 A1 | 3/2015 | Shen et al. |
| 2015/0092552 A1 | 4/2015 | Bajj et al. |
| 2015/0131524 A1 | 5/2015 | Cavalcante et al. |
| 2015/0140955 A1 | 5/2015 | Chakraborty et al. |
| 2015/0271714 A1 | 9/2015 | Shetigar et al. |
| 2015/0281974 A1 | 10/2015 | Ghasemzadeh et al. |
| 2015/0312769 A1 | 10/2015 | Shindo |
| 2015/0358892 A1 | 12/2015 | Pandey et al. |
| 2015/0358940 A1 | 12/2015 | Zhang et al. |
| 2016/0057699 A1 | 2/2016 | Jang |
| 2016/0088493 A1 | 3/2016 | Byun et al. |
| 2016/0100451 A1 | 4/2016 | Wass et al. |
| 2016/0150420 A1 | 5/2016 | Byun et al. |
| 2016/0174149 A1 | 6/2016 | Byun et al. |
| 2016/0192177 A1 | 6/2016 | Kim et al. |
| 2016/0255529 A1 | 9/2016 | Zhang et al. |
| 2016/0295357 A1 | 10/2016 | Grayson et al. |
| 2016/0323931 A1 | 11/2016 | Huang et al. |
| 2017/0041098 A1 | 2/2017 | Saghir et al. |
| 2017/0055186 A1 | 2/2017 | Donepudi et al. |
| 2017/0055193 A1 | 2/2017 | Mueck et al. |
| 2017/0064557 A1 | 3/2017 | Alsohaily et al. |
| 2017/0086181 A1 | 3/2017 | Briggs |
| 2017/0289904 A1 | 10/2017 | Li |
| 2017/0303188 A1 | 10/2017 | Fitch et al. |
| 2017/0311255 A1 | 10/2017 | Hessler et al. |
| 2017/0318526 A1 | 11/2017 | Wang et al. |
| 2018/0027582 A1 | 1/2018 | Yerramalli et al. |
| 2018/0049098 A1 | 2/2018 | Ueda |
| 2018/0054840 A1 | 2/2018 | Fitch et al. |
| 2018/0146475 A1 | 5/2018 | Mitsui et al. |
| 2018/0262922 A1 | 9/2018 | Mackenzie et al. |
| 2018/0376327 A1 | 12/2018 | Sivavakeesar |
| 2019/0098582 A1 | 3/2019 | Mackenzie et al. |
| 2019/0313329 A1 | 10/2019 | Mackenzie et al. |
| 2019/0394704 A1 | 12/2019 | Lou et al. |
| 2020/0154332 A1 | 5/2020 | Tsuda et al. |

FOREIGN PATENT DOCUMENTS

| | | | |
|---|---|---|---|
| CN | 102612842 A | 7/2012 | |
| CN | 102695251 A | 9/2012 | |
| CN | 102695253 A | 9/2012 | |
| CN | 103024880 A | 4/2013 | |
| CN | 103249111 A | 8/2013 | |
| CN | 104113897 A | 10/2014 | |
| CN | 104469830 A | 3/2015 | |
| CN | 104885494 A | 9/2015 | |
| CN | 104969625 A | 10/2015 | |
| CN | 105323830 A | 2/2016 | |
| CN | 105611554 A | 5/2016 | |
| CN | 102595564 B | 8/2016 | |
| CN | 110719593 A | 1/2020 | |
| EP | 2154917 A1 | 2/2010 | |
| EP | 2271142 A1 | 1/2011 | |
| EP | 2375807 A1 | 10/2011 | |
| EP | 2533571 A1 | 12/2012 | |
| EP | 2663131 A1 | 11/2013 | |
| EP | 2814279 A1 | 12/2014 | |
| EP | 2916584 A1 | 9/2015 | |
| EP | 2928225 A1 | 10/2015 | |
| EP | 2975886 A1 * | 1/2016 | ............ H04W 36/16 |
| EP | 3065438 A1 | 9/2016 | |
| EP | 3224959 B1 * | 2/2019 | ............ H04B 1/1036 |
| GB | 2554543 A | 4/2018 | |
| GB | 2554544 A | 4/2018 | |
| GB | 2579042 A | 6/2020 | |
| JP | 2013201576 A | 10/2013 | |
| WO | WO-2009022976 A1 | 2/2009 | |
| WO | WO-2010024743 A1 | 3/2010 | |
| WO | WO-2011028158 A1 | 3/2011 | |
| WO | WO-2011056023 A2 | 5/2011 | |
| WO | WO-2012138125 A2 | 10/2012 | |
| WO | WO-2012148442 A1 | 11/2012 | |
| WO | WO-2013071813 A1 | 5/2013 | |
| WO | WO-2013120274 A1 | 8/2013 | |
| WO | WO-2013142361 A1 | 9/2013 | |
| WO | WO-2013167335 A1 | 11/2013 | |
| WO | WO-2014111806 A1 | 7/2014 | |
| WO | WO-2014161896 A1 | 10/2014 | |
| WO | WO-2014175919 A1 | 10/2014 | |
| WO | WO-2015006047 A1 | 1/2015 | |
| WO | WO-2015019317 A1 | 2/2015 | |
| WO | WO-2015020479 A1 | 2/2015 | |
| WO | WO-2015034775 A1 | 3/2015 | |
| WO | WO-2015060172 A1 | 4/2015 | |
| WO | WO-2015062060 A1 | 5/2015 | |
| WO | WO-2015134985 A1 | 9/2015 | |
| WO | WO-2016056964 A1 | 4/2016 | |
| WO | WO-2016079016 A1 | 5/2016 | |
| WO | WO-2016134676 A1 | 9/2016 | |
| WO | WO-2016146328 A1 | 9/2016 | |
| WO | WO-2016151653 A1 | 9/2016 | |
| WO | WO-2016185946 A1 | 11/2016 | |
| WO | WO-2017148752 A1 | 9/2017 | |
| WO | WO-2018059858 A1 | 4/2018 | |
| WO | WO-2018059859 A1 | 4/2018 | |
| WO | WO-2018059860 A1 | 4/2018 | |
| WO | WO-2018111166 A1 | 6/2018 | |
| WO | WO-2019015900 A1 | 1/2019 | |
| WO | WO-2020098640 A1 | 5/2020 | |
| WO | WO-2020098985 A1 | 5/2020 | |

(56) References Cited

OTHER PUBLICATIONS

3GPP, "Issues on X2-GW deployment," 3rd Generation Partnership Project (3GPP), 3GPP TSG-RAN3 Meeting #79bis, R3-130571, Apr. 2013, 6 pages.
3GPP TR 24.826 V11.0.0 (Jun. 2011), "3rd Generation Partnership Project, Technical Specification Group Core Network and Terminals; Study on impacts on signalling between User Equipment (UE) and core network from energy saving, (Release 11)," 650 Route des Luciales—Sophia Antipolis Valbonne—France, 33 pages.
3GPP TR 36.927 V15.0.0 (Jul. 2018), "3rd Generation Partnership Project, Technical Specification Group Radio Access Network; Evolved Universal Terrestrial Radio Access (E-UTRA), Potential solution for energy saving for E-UTRAN (Release 15)," 650 Route des Luciales—Sophia Antipolis Valbonne—France, 22 pages.
3GPP TS 24.301 V17.2.0, "3rd Generation Partnership Project;Technical Specification Group Core Network and Terminals; Non-Access-Stratum (NAS) protocol for Evolved Packet System (EPS); Stage 3 (Release 17)," Technical Specification, (Mar. 2021), 588 pages.
3GPP TS 32.551 V15.0.0 (Jun. 2018), "3rd Generation Partnership Project, Technical Specification Group Services and System Aspects, Concepts and requirements; Telecommunication management, Energy Saving Management (ESM)," (Release 15), 650 Route des Luciales—Sophia Antipolis Val bonne—France, 26 pages.
3GPP TS 36.300 V11 6.0 (Jun. 2013), "3rd Generation Partnership Project; Technical Specification Group Radio Access Network; Overall description, Evolved Universal Terrestrial Radio Access (E-UTRA) and Evolved Universal Terrestrial Radio Access Network (EUTRAN), Stage 2" (Release II), 650 Route des Luciales—Sophia Antipolis Valbonne—France, 209 pages.
3GPP TS 36.300 V1 3.3.0 (Mar. 2016), "3rd Generation Partnership Project, Technical Specification Group Radio Access Network, Overall description, Stage 2 Evolved Universal Terrestrial Radio Access (E-UTRA) and Evolved Universal Terrestrial Radio Access Network (E-UTRAN)," (Release 13), 650 Route des Luciales—Sophia Antipolis Valbonne—France, 295 pages.
3GPP Ts 36.300 V16.1.0 (Mar. 2020), "3rd Generation Partnership Project, Technical Specification Group Radio Access Network, Evolved Universal Terrestrial Radio Access (E-UTRA) and Evolved Universal Terrestrial Radio Access Network (E-UTRAN)," Overall description, stage 2, (Release 16), 387 pages.
3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2, Release 14, 3GPP TS 36.300 V14.2.0, Mar. 2017, 330 pages.
3rd Generation Partnership Project, Technical Specification Group Radio Access Network, Evolved Universal Terrestrial Radio Access (E-UTRA), Radio Frequency (RF) system scenarios (Release 9) 3GPP TR 36.942 V9.3.0, Jun. 2012, 83 pages.
3rd Generation Partnership Project, Technical Specification Group Radio Access Network, Evolved Universal Terrestrial Radio Access Network (E-UTRAN), X2 application protocol (X2AP), Release 14, 3GPP TS 36.423 V14.2.0, Mar. 2017, 242 pages.
3rd Generation Partnership Project, Technical Specification Group Services and System Aspects, Telecommunication Management, "Study On Management Of Evolved Universal Terrestrial Radio Access Network (E-UTRAN) And Evolved Packet Core (EPC)," Release 8 3GPP TR 32.816 V8.0.0, Technical Report, Valbonne—France, Dec. 2008, 38 pages.
4G Ameucas, "Self-Optimizing Networks: The Benefits of SON in LTE," XP40674838A, Jul. 2011, 69 pages.
Annex to the Commission implementing regulation, specifying the characteristics of small-area wireless access points pursuant to Article 57(2) of Directive (EU) 2018/1972 of the European Parliament and the Council establishing the European Electronic Communications Code, Feb. 27, 2020, 2 pages.
Application and File History for U.S. Appl. No. 16/079,327, filed Aug. 23, 2018, Inventor(s): Briggs et al. as available on PAIR.
Application and Filing Receipt for U.S. Appl. No. 15/516,765, filed Apr. 4, 2017, Inventor(s): Fitch et al. as available on PAIR.
Application and Filing Receipt for U.S. Appl. No. 15/553,708, filed Aug. 25, 2017, Inventor(s): Fitch et al, as available on PAIR.
Application and Filing Receipt for U.S. Appl. No. 15/762,022, filed Mar. 21, 2018, Inventor(s): MacKenzie et al. as available on PAIR.
Application and Filing Receipt for U.S. Appl. No. 16/023,917, filed Jun. 29, 2018, Inventor(s): MacKenzie et al. as available on PAIR.
Application and File History for U.S. Appl. No. 16/947,152, filed Jul. 21, 2020, inventors Mackenzie, et al., as available on PAIR.
Application and Filing Receipt for U.S. Appl. No. 16/082,870, filed Feb. 8, 2017, Inventor(s): MacKenzie et al. as available on PAIR.
Application and Filing Receipt for U.S. Appl. No. 16/335,708, filed Mar. 22, 2019, Inventor(s): Mackenzie et al. as available on PAIR.
Application and Filing Receipt for U.S. Appl. No. 16/335,802, filed Mar. 22, 2019, Inventor(s): Mackenzie et al. as available on PAIR.
Application and Filing Receipt for U.S. Appl. No. 16/335,863, filed Mar. 22, 2019, Inventor(s): Mackenzie et al. as available on PAIR.
Barakat B., et al., "Energy Efficient Carrier Aggregation for LTE Advanced," Proceedings of the 8th IEEE GCC Conference and Exhibition, Muscat, Oman, Feb. 1-4, 2015, 5 pages.
Carlson et al., "Scheduling To Minimize Interaction Cost," The Johns Hopkins University, Baltimore, Maryland, Jun. 2, 1965, 8 pages.
Chavarria-Reyes E., et al., "Energy-Efficient Multi-Stream Carrier Aggregation for Heterogeneous Networks in 5G Wireless Systems," IEEE Transactions on Wireless Communications, vol. 15, No. 11, Nov. 2016, pp. 7432-7443.
Codan Radio, "RF Link Controlled Base Station," Codan Radio Communications, retrieved from https://www.codanradio.com/product/rf-link-controlled-base/, Accessed on Aug. 8, 2017, 2 pages.
Combined Search and Examination Report under Section 17 and 18(3) for Application No. GB1616539.1, dated Mar. 2, 2017, 6 pages.
Combined Search and Examination Report under Section 17 and 18(3) for GB Application No. 1616530.0, dated Feb. 23, 2017, 6 pages.
Combined Search and Examination Report under Section 17 and 18(3) for GB Application No. 1713816.5, dated Sep. 20, 2017, 5 pages.
Combined Search and Examination Report under Section 17 and 18(3) for GB Application No. 2009306.8, dated Nov. 16, 2020, 5 pages.
Combined Search and Examination Report under Section 17 and 18(3) for GB Application No. 2009328.2, dated Dec. 1, 2020, 5 pages.
Combined Search and Examination Report under Section 17 and 18(3) for GB Application No. 2009339.9, dated Dec. 15, 2020, 7 pages.
Combined Search and Examination Report under sections 17 & 18(3) for Great Britain Application No. 1616534.2, dated Mar. 1, 2017, 8 pages.
Combined Search and Examination Report under sections 17 & 18(3) for Great Britain Application No. 1713815.7, dated Sep. 21, 2017, 5 pages.
Communication pursuant to Article 94(3) EPC for European Application No. 17761237.1, dated Dec. 8, 2020, 8 pages.
Communication pursuant to Article 94(3) EPC for European Application No. 17764775.7, dated May 20, 2021, 5 pages.
Communication pursuant to Article 94(3) EPC for European Application No. 17764775.7, dated Sep. 3, 2020, 5 pages.
ETSI TR 136 927 V13.0.0 (Jan. 2016), "Evolved Universal Terrestrial Radio Access (E-UTRA); Potential Solutions for Energy Saving for E-UTRAN," Technical Report LTE, 3GPP TR 36.927 version 13.0.0 Release 13, 650 Route des Luciales—Sophia Antipolis Valbonne—France, 26 pages.
ETSI TS 132 551 V13.0.0 (Feb. 2016), "Universal Mobile Telecommunications System (UMTS); LTE, Telecommunication management Energy Saving Management (ESM); Concepts and requirement," Technical Specification, Release 13, 650 Route des Luciales—Sophia Antipolis Valbonne—France, 28 pages.
European Search Report for Application No. 21173324.1, dated Jun. 17, 2022, 10 pages.
European Search Report for EP Application No. 16158665.6 dated Sep. 13, 2016, 6 pages.

(56) References Cited

OTHER PUBLICATIONS

European Search Report for EP Application No. 16160809.6 dated Sep. 26, 2016, 14 pages.
European Search Report for EP Application No. 16191517.8, dated Mar. 27, 2017, 8 pages.
European Search Report for EP Application No. 16191519.4, dated Mar. 31, 2017, 8 pages.
European Search Report for EP Application No. 16191524.4, dated Apr. 7, 2017, 10 pages.
European Search Report for EP Application No. 17180358.8, dated Jan. 31, 2018, 5 pages.
Examination Report under section 18(3) for GB Application No. 1713816.5, dated Oct. 10, 2017, 3 pages.
Examination Report under section 18(3) for GB Application No. 1713816.5, dated Nov. 15, 2018, 3 pages.
Examination Report under Section 18(3) for GB Application No. 2009328.2, dated Jul. 20, 2022, 3 pages.
Examination Report under section 18(3) for Great Britain Application No. 1713815.7, dated Nov. 15, 2018, 3 pages.
Extended European Search Report for Application No. 19194981.7, dated Nov. 27, 2019, 8 pages.
Extended European Search Report for Application No. 15187067.2, dated Mar. 18, 2016, 8 pages.
Extended European Search Report for Application No. 17181876.8, dated Jan. 8, 2018, 11 pages.
Extended European Search Report for Application No. 21173324.1, dated Oct. 29, 2021, 10 pages.
Extended European Search Report for Application No. EP14194204.5, dated Jul. 23, 2015, 7 pages.
Extended European Search Report for Application No. EP15275077.4, dated Sep. 4, 2015, 8 pages.
Fairbrother et al., "A Two-Level Graph Partitioning Problem Arising in Mobile Wireless Communications"; arXiv: 1705.08773v1 [math.OC] May 24, 2017; 23 pages.
First Office Action dated Apr. 26, 2022 for Japanese Application No. 2021-099329 filed Jun. 15, 2021, 5 pages.
GB Search Report for Application No. 1517069.9, dated Mar. 7, 2016, 4 pages.
GB Combined Search and Examination Report for Application No. 1517069.9, dated Jan. 31, 2018, 3 pages.
GB Combined Search and Examination Report for Application No. 1711529.6, dated Dec. 13, 2017, 7 pages.
GB Combined Search and Examination Report for GB Application No. GB1603748.3, dated Aug. 26, 2016, 6 pages.
GB Search and Examination Report for GB Application No. GB 1710989.3, dated Dec. 1, 2017, 5 pages.
Ghaddar et al., "A Branch-And-Cut Algorithm Based On Semidefinite Programming For The Minimum K-Partition Problem," Ann Oper Res DOI 10 1007/s10479-008-0481-4, Springer Science+Business Media, LLC 2008, Published online Dec. 3, 2008, 20 pages.
GSM Association, GSM Association, GSMA FLOOR2 Thewalbrook Building 25 Wallbrook London, UK, Apr. 22, 2013 (Apr. 22, 2013), XP040674838.
GSMA "Infrastructure Sharing: An Overview," last updated Jun. 18, 2019, Retrieved from https://www.gsma.com/futurenetworks/wiki/infrastructure-sharing-an-overview/, 18 pages.
Huawei, "Report of Email Discussion [97bis#19][LTE/FeD2D]-Grouphandover," 3GPP Draft, R2-1705300, 3rd Generation Partnership Project (3GPP), 3GPP TSG RAN WG2#98, Hangzhou, China, May 15-19, 2017, 18 pages.
Intention to Grant for GB Application No. 1713815.7, dated Jan. 14, 2019, 2 pages.
Intention to Grant for GB Application No. 1713816.5, dated Jan. 14, 2019, 2 pages.
International Preliminary Report on Patentability for Application No. PCT/EP2015/076524, dated Mar. 7, 2017, 12 pages.
International Preliminary Report on Patentability for Application No. PCT/EP2016/053286, dated Feb. 6, 2017, 14 pages.
International Preliminary Report on Patentability for Application No. PCT/EP2016/069745, dated Oct. 20, 2017, 13 pages.
International Preliminary Report on Patentability for Application No. PCT/EP2017/052738, dated Jun. 22, 2018, 27 pages.
International Preliminary Report on Patentability for Application No. PCT/EP2017/071645, dated Apr. 11, 2019, 14 pages.
International Preliminary Report on Patentability for Application No. PCT/EP2017/071646, dated Apr. 11, 2019, 8 pages.
International Preliminary Report on Patentability for Application No. PCT/EP2017/071649, dated Apr. 11, 2019, 8 pages.
International Preliminary Report on Patentability for Application No. PCT/EP2021/062478, dated Jun. 22, 2022, 15 pages.
International Preliminary Report on Patentability for Application No. PCT/EP2021/062479, dated Jun. 17, 2022, 10 pages.
International Preliminary Report on Patentability for Application No. PCT/EP2021/066406, dated Jun. 9, 2022, 10 pages.
International Preliminary Report on Patentability for Application No. PCT/EP2021/066406, dated Aug. 30, 2022, 20 pages.
International Preliminary Report on Patentability for PCT Application No. PCT/EP2017/053957, dated Sep. 4, 2018, 6 pages.
International Search Report and Written Opinion for Application No. PCT/EP2015/076524, dated Dec. 21, 2015, 11 pages.
International Search Report and Written Opinion for Application No. PCT/EP2016/053286, dated Apr. 11, 2016, 11 pages.
International Search Report and Written Opinion for Application No. PCT/EP2016/069745, dated Nov. 11, 2016, 11 pages.
International Search Report and Written Opinion for Application No. PCT/EP2017/071645, dated Nov. 27, 2017, 21 pages.
International Search Report and Written Opinion for Application No. PCT/EP2017/071646, dated Oct. 18, 2017, 12 pages.
International Search Report and Written Opinion for Application No. PCT/EP2017/071649, dated Oct. 12, 2017, 9 pages.
International Search Report and Written Opinion for Application No. PCT/EP2018/066116, dated Aug. 29, 2018, 11 pages.
International Search Report and Written Opinion for Application No. PCT/EP2021/062478, dated Aug. 25, 2021, 23 pages.
International Search Report and Written Opinion for Application No. PCT/EP2021/062479, dated Jul. 22, 2021, 21 pages.
International Search Report and Written Opinion for Application No. PCT/EP2021/066406, dated Oct. 14, 2021, 16 pages.
International Search Report and Written Opinion for PCT Application No. PCT/EP2017/052738, dated Mar. 27, 2017, 20 pages.
International Search Report and Written Opinion for PCT Application No. PCT/EP2017/053957, dated May 23, 2017, 11 pages.
Invitation to pay additional fees and, where applicable, protest fee for PCT Application No. PCT/EP2017/071645, mailed Oct. 9, 2017, 17 pages.
Jots NHIB Specification, "Joint Operator Technical Specification of the neutral host in-building solution Annex 1 Architecture (v0.11)," 57 pages.
Kumar S.S., et al., "Energy Efficient Rate Coverage with Base Station Switching and Load Sharing in Cellular Networks," 2016 8th International Conference on Communication Systems and Networks (COMSNETS), 2016, 6 pages.
MacQueen J., "Some Methods For Classification And Analysis Of Multivariate Observations," Fifth Berkeley Symposium, University of California, Los Angeles, 1967, pp. 281-297.
Morris D., JOTS Neutral Host In-Building, Sep. 17, 2019, 16 pages.
Motorola, et al., "Draft CR capturing HeNB inbound mobility agreements," 3GPP Draft, R2-096401 CR HENB 36_300 Agreements_V7, 3rd Generation Partnership Project (3GPP), Jeju, Korea, XP050391033, Nov. 9, 2009, 4 pages.
Mukhopadhyay et al., "Novel RSSI Evaluation Models For Accurate Indoor Localization With Sensor Networks," 978-1-4799-2361-8/14, Bharti School of Telecommunication Technology and Management IIT Delhi Hauz Khas, New Delhi, 2014 IEEE, 6 pages.
New Postcom, "X2 Connection and Routing for X2-GW Deployment," 3GPPDRAFT, R3-130225, 3rd Generation Partnership Project (3GPP), 3GPP TSG RAN WG3 Meeting #79, St. Julian's, Malta, Jan. 28-Feb. 1, 2013, 3 pages.
NGNM the engine of broadband wireless innovation "Recommended Practices for multi-vendor SON deployment," Deliverable D2 Version 1.0 by NGNM Alliance, Reading Bridge House George Street Reading Berkshire RG 1 8LS UK, Jan. 28, 2014, 30 pages.

(56) References Cited

OTHER PUBLICATIONS

Ning L., et al., "Fuzzy Layered Physical Cell Identities Assignment in Heterogeneous and Small Cell Networks," Electronics Letters May 12, 2016, vol. 52 No. 10, pp. 879-881.
Nokia Siemens Networks., "X2 Interface Proxy at DeNB," R3-101662, 3rd Generation Partnership Project(3GPP), 3GPP TSG-RAN WG Meeting #70, Montreal, Canada, May 10-14, 2010, 5 pages.
Office Action For Chinese Application No. 201780059576.7, dated Apr. 28, 2021, 14 pages.
Office Action For Chinese Application No. 201780059576.7, dated Dec. 27, 2021, 12 pages.
Office Action For Chinese Application No. 201780059626.1, dated Apr. 30, 2021, 12 pages.
Office Action For Chinese Application No. 201780059626.1, dated Dec. 27, 2021, 16 pages.
Office Action For Chinese Application No. 201780060189.5, dated Apr. 27, 2021, 14 Pages.
Office Action For Chinese Application No. 201780060189.5, dated Sep. 23, 2021, 7 pages.
Opadere J., et al., "Energy-Efficient Virtual Radio Access Networks for Multi-Operators Cooperative Cellular Networks," IEEE Transactions on Green Communications and Networking, vol. 3, No. 3, Sep. 2019, pp. 603-614.
Opadere J., et al. "Energy-Efficient RRH Sleep Mode for VirtualRadio Access Networks," IEEE, 2017, 6 pages.
Qualcomm Technologies, Inc. "LTE Small Cell SON Test Cases, Functionality and Interworking", San Diego, CA, USA, Jun. 5, 2015, 82 pages.
Qualcomm Europe, "QoS principles for CSG members and non-members at hybrid access mode HeNBs," 3GPP Draft, R3-091022, 3rd Generation Partnership Project (3GPP), San Francisco, US, XP050341407, May 4-8, 2009, 4 pages.
Qualcomm Europe, "QoS support for hybrid CSG cells," 3GPP Draft, R3-091454, 3rd Generation Partnership Project (3GPP), San Francisco, US, XP050341776, May 4, 2009, 3 pages.
Rendl F., "Semidefinite Relaxations For Partitioning, Assignment And Ordering Problems," Cross Mark, Ann Oper Res (2016) 240 119-140 DOI 10 1007/s10479-015-2015-1, Published online Sep. 15, 2015, Springer Science+Business Media New York 2015, 22 pages.
Search Report under Section 17 for GB Application No. 2009312.6, dated Nov. 23, 2020, 4 pages.
Small Cell Forum Release 9.0, Document 176.09.01 LTE small cell SON test cases, Functionality and interworking, version 176.09.01, Feb. 21, 2017, 95 pages.
UK Combined Search and Examination Report for GB Patent Application No. GB1604515.5, dated Sep. 9, 2016, 3 pages.
UK Examination Report for GB Patent Application No. GB1604515. 5, dated May 11, 2017, 1 pages.
UK Examination Report for GB Patent Application No. GB1604515. 5, dated Jan. 31, 2018, 3 pages.
UK Intention to Grant for GB Patent Application No. GB1604515.5, dated May 11, 2018, 2 pages.
Web article, "DSDP," NEOS Interfaces to DSDP, http://www.mcs.anl.gov/DSDP, retrieved Jul. 3, 2017, 4 pages.
Web article, "Welcome to CVXPY," Welcome to CVXPY—CVXPY 0.4.9 documentation, http://www.cvxpy.org/en/latest, retrieved Jul. 3, 2017, 1 page.
Wu et al., "Physical Cell Identity Self-Organization for Home eNodeB Deployment in LTE"; Nokia Siemens Networks, 978-1-4244-3709-2/10, Beijing China, 2010 IEEE, 6 pages.
Younis., et al., "Military Communications; Cognitive MANET Design For Mission-Critical Networks," IEEE Communications Magazine, 0163-6804/09 2009 IEEE, Oct. 2009, 5 pages.

* cited by examiner

Legend

☐ Normal (active) mode

▨ Compensation mode

▦ Energy saving mode

CELLULAR TELECOMMUNICATIONS NETWORK

RELATED APPLICATION

The present application claims priority to GB Application No. 2009312.6 filed Jun. 18, 2020, which is hereby incorporated herein in its entirety by reference.

TECHNICAL FIELD

The present disclosure relates to a cellular telecommunications network.

BACKGROUND

A cellular telecommunications network includes a base station providing voice and data services to a plurality of User Equipment (UE) via wireless communications. The base station is (at least in part) located at a cell site, which further includes supporting infrastructure (such as a power supply) for operating the base station. In traditional architectures, the cell site and base station are owned and operated by a single Mobile Network Operator (MNO) and the base station connects solely to that MNO's core network. The base station typically includes an antenna support (e.g. a mast, an antenna frame or rooftop attachment), one or more antennae and one or more controllers (e.g. a Radio Network Controller (RNC)).

There are several ways in which MNOs may cooperate to share infrastructure. The most basic example of shared MNO infrastructure, known as site sharing, is where the physical cell site is shared between MNOs but each MNO maintains ownership and control of the base station equipment (e.g. mast, antenna and controller). The base station supporting equipment (e.g. power supply) may or may not be shared between the MNOs in a site sharing arrangement. In a further example of shared MNO infrastructure, known as mast sharing, the base station's mast (or equivalent antenna support) is shared between MNOs, but each MNO maintains ownership and control of the remaining base station equipment (the antennae and controllers). Again, the base station supporting equipment (e.g. power supply) may or may not be shared between the MNOs in a mast sharing arrangement.

A more comprehensive form of shared MNO infrastructure is known as a Multi-Operator Radio Access Network (MORAN) in which the cell site, base station equipment and base station supporting equipment are shared between MNOs. The base station equipment must be configured to communicate with UEs of all MNOs, such as by transmitting each operator's Public Land Mobile Network (PLMN) identifier in the respective signals, but must communicate within each MNO's dedicated spectrum range. The base station equipment must also be configured to direct traffic to the appropriate MNO's core network. A similar arrangement is known as Multi-Operator Core Network (MOCN), in which the cell site, base station equipment and base station supporting equipment are again shared between MNOs and may also use shared spectrum ranges for communications with UEs of different MNOs.

A further alternative to shared infrastructure is where the cell site, base station and base station supporting equipment are owned and/or managed by a $3^{rd}$ party, and one or more MNOs operate on the $3^{rd}$ party's infrastructure. This is known as a "neutral host".

A challenge in modern cellular telecommunications network is for MNOs to meet energy efficiency targets. These targets may create a downward pressure on the maximum capacity and coverage an MNO's base station may offer. To address this concern, energy saving mechanisms were introduced which allow a base station to enter an energy saving mode (where most if not all operations are suspended). To ensure continuity of service to UE previously served by the energy saving base station, the UE may be transferred to one or more neighboring base stations. The neighboring base station may alter its coverage area in order to provide service.

SUMMARY

According to a first aspect of the disclosure, there is provided a method of operating a cellular telecommunications network, wherein the cellular telecommunications network includes a first transceiver providing a first access connection, a second transceiver providing a second access connection, and a third transceiver providing a third access connection, wherein the first and second transceivers are co-located, the method comprising: determining that the third transceiver should enter energy saving mode; in response to the determination: causing reconfiguration of the first transceiver to reduce its transmission power, causing reconfiguration of the second transceiver so as to increase its transmit power of the second access connection and to compensate for the third transceiver.

According to a second aspect of the disclosure, there is provided a computer program comprising instructions which, when the program is executed by a computer, cause the computer to carry out the method of the first aspect of the disclosure.

According to a third aspect of the disclosure, there is provided a network node having a processor configured to carry out the method of the first aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
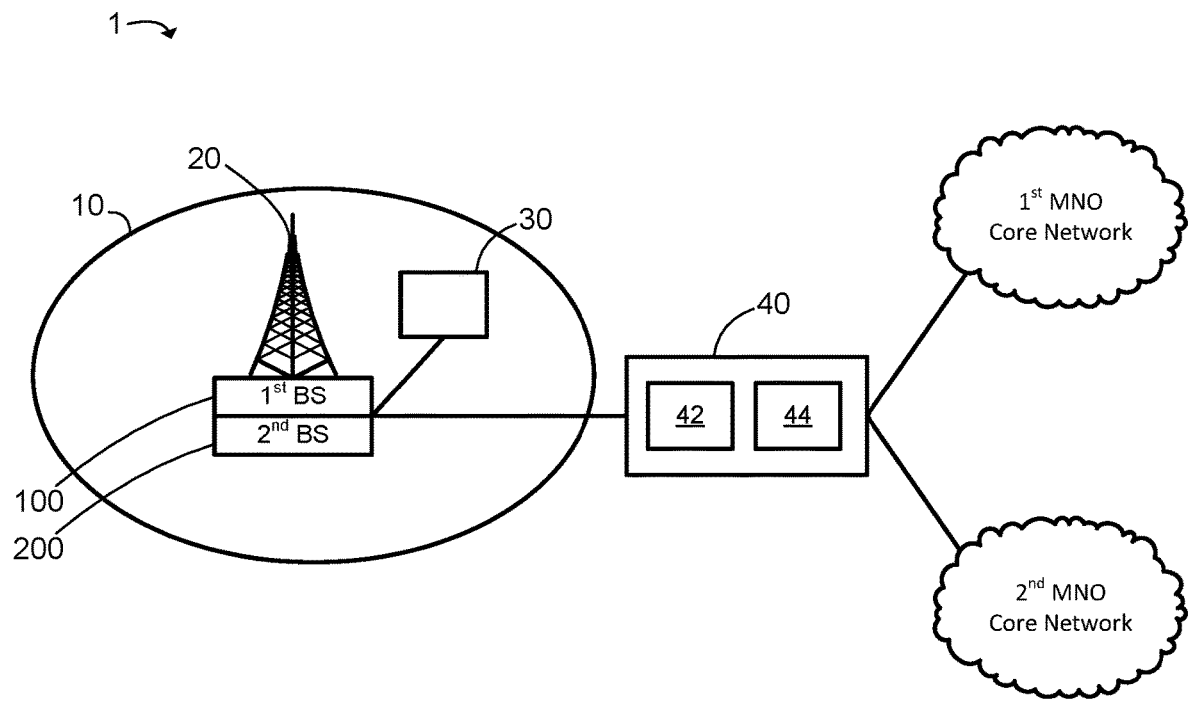
FIG. 1 is a schematic diagram of an embodiment of a cellular telecommunications network of the present disclosure.

A first embodiment of a cellular telecommunications network 1 will now be described with reference to FIG. 1. FIG. 1 illustrates a cell site 10 including a mast 20 and base station support equipment 30 (shown as a single unit, but may comprise several components such as a power supply, cooling unit, etc.). The cell site 10, mast 20 and base station supporting equipment 30 are shared by a first Mobile Network Operator (MNO) and second MNO. The first MNO deploys a first base station 100 at the cell site, such that one or more transceivers are positioned on the mast 20 and any processing equipment is located in the cell site 10 (and may utilize the base station supporting equipment 30). The second MNO also deploys a second base station 200 at the cell site 10, such that one or more transceivers for the second base station 200 are positioned on the mast 20 and any processing equipment is located in the cell site 10 (again, this may utilize the base station supporting equipment 30). The processing equipment of the first and second base stations 100, 200 may operate on dedicated hardware, or may operate in virtualized environments on a common hardware platform.

FIG. 1 also illustrates a neutral host site 40. The neutral host site 40 has a transport connection with the first and second base stations 100, 200, a first backhaul connection with the core network of the first MNO and a second backhaul connection with the core network of the second MNO. These connections are typically optical fiber connections. The neutral host site 40 includes a controller 42 and router 44. The router 44 is responsible for routing traffic for the first base station 100 to/from the core network of the first MNO, and for routing traffic for the second base station 200 to/from the core network of the second MNO. The controller 42 is responsible for the management of shared operations at the cell site and for implementing embodiments of the method of the present invention (discussed below).

Figure 2:
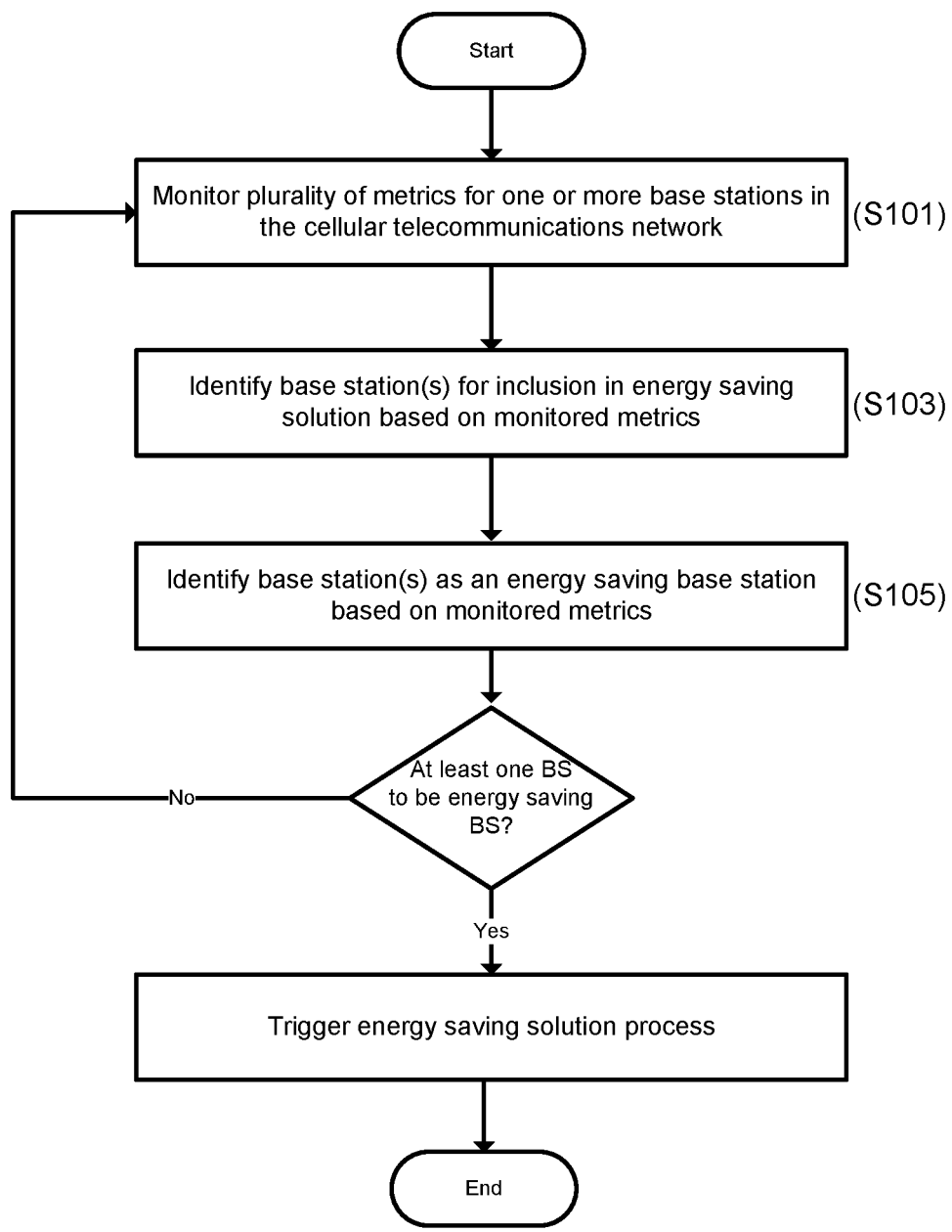
FIG. 2 is a flow diagram illustrating a first process implemented in a first embodiment of a method of the present disclosure.

Before discussing the embodiments of the method of the present disclosure in more detail, an overview of two processes (used in these embodiments) will be described. A first process is an energy saving trigger mechanism. In S101 of this first process (as shown in FIG. 2), the neutral host controller 42 monitors a plurality of metrics for a plurality of base stations (including the first and second base stations 100, 200 of the cellular telecommunications and, in this embodiment, neighboring base stations). These metrics include:

A measure of load, such as radio throughput as a proportion of radio capacity or the proportion of radio resources being used;
A measure of energy consumption (which may be converted to the equivalent measurement in units of carbon dioxide emissions); and
An identifier of each service offering and commitment.

In S103, the neutral host controller 42 determines whether one or more of the plurality of metrics for each monitored base station satisfy at least one criterion for inclusion in an energy saving solution (e.g. to become a compensation base station). These energy saving solutions will be discussed in more detail in the second process, detailed below. The criterion may be, for example, that the measure of load indicates that the base station has sufficiently low load such that it may compensate for another base station that is entering energy saving mode, or the base station does not have any service offerings/commitments that prohibit a switch from normal (active) mode to either energy saving mode or compensation mode. All base stations that meet the at least one criterion are identified for inclusion in the candidate energy saving solutions. If all metrics for a base station do not meet the criterion/criteria, then that base station is not identified for inclusion in the candidate energy saving solutions.

In S105, the neutral host controller 42 determines whether one or more of the plurality of metrics for each monitored base station meet at least one energy saving criterion, such as the measure of load dropping below a threshold indicating sufficiently low load, the measure of energy consumption surpassing a threshold indicating that the base station (or MNO) has consumed too much energy and/or is responsible for too many units of carbon dioxide emissions (based on the MNO's energy targets), and/or that the base station doesn't implement a service offering/commitment that prevents it from entering energy saving mode. If one or more of these metrics for a base station meet the at least one criterion, then the neutral host controller identifies that base station for inclusion as a potential energy saving base station in the second process. If all metrics for a base station do not meet the relevant criterion/criteria, then that base station is not identified as a potential energy saving base station in the second process. Once all metrics for all base stations have been analyzed and at least one base station is identified for inclusion as a potential energy saving base station, then the second process is triggered.

Figure 3:
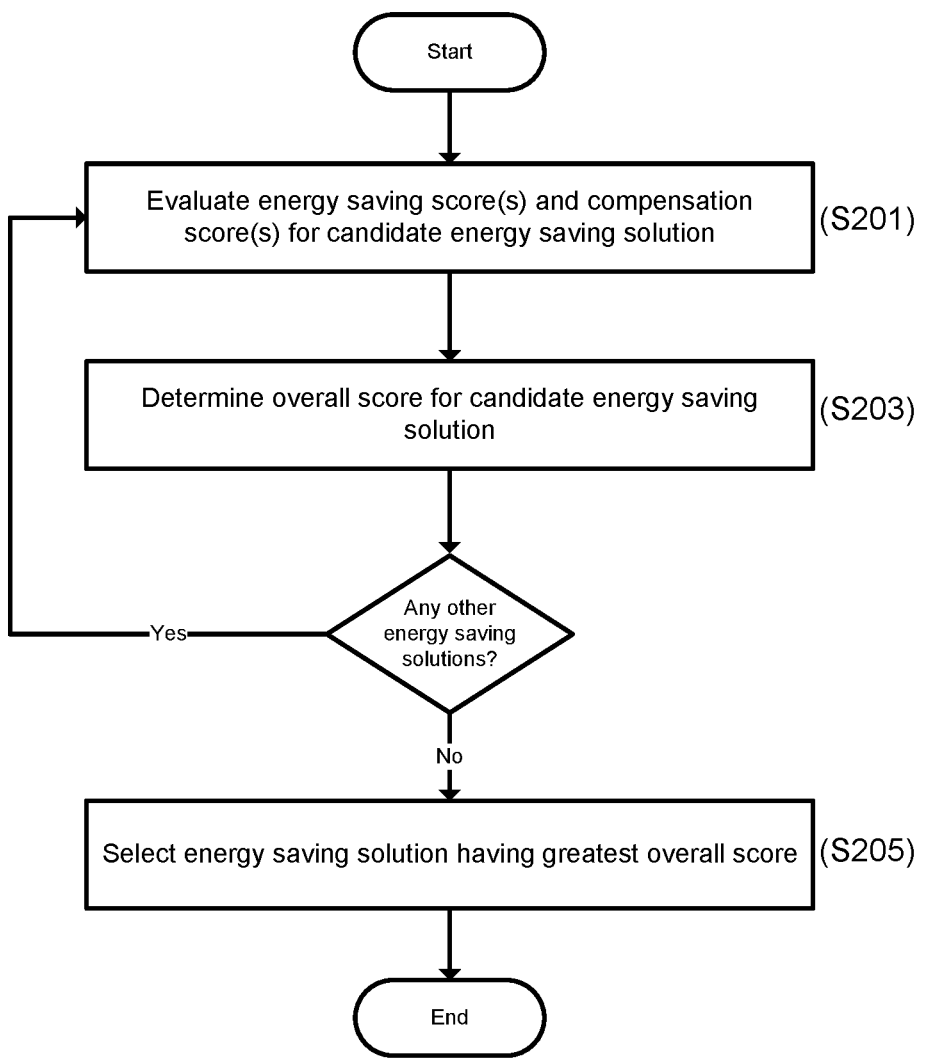
FIG. 3 is a flow diagram illustrating a second process implemented in the first embodiment of a method of the present disclosure.

The second process for determining a suitable energy saving solution is shown in FIG. 3. In overview, this neutral host controller 42 evaluates a plurality of candidate energy saving solutions based on the results of the first process. The neutral host controller 42 evaluates all possible variations of candidate energy saving solutions in which the one or more of the base stations identified as potential energy saving base stations (in the first process) enter energy saving mode, and one or more base stations identified for inclusion as part of the energy saving solution each act in energy saving mode, normal (active) mode, or compensation mode. For each candidate, the neutral host controller 42 evaluates a weighted score of a base station's suitability to enter energy saving mode (the "energy saving score") for each base station entering energy saving mode in that candidate solution, a weighted score representing a base station's suitability to act in compensation mode (the "compensation score") for each base station entering compensation mode in that candidate solution, and sums these energy saving and compensation scores to get an overall score for that candidate solution.

For example, the neutral host controller 42 may evaluate a first candidate energy saving solution in which the first base station 100 enters energy saving mode and the second base station 200 enters compensation mode. In S201, the neutral host controller 42 evaluates the energy saving score of the first base station 100 and the compensation score of the second base station 200. The energy saving score, ES, is evaluated as:

$$ES_n^i = L_n^i * D_n^i * (1 - C_n^i)$$

in which,
n is an identifier for the base station being evaluated for entering energy saving mode;
i is an identifier for the candidate solution being evaluated (as there may be a different ES score for the same base station where there are several different candidate solutions);
L represents the load for base station n, normalized to a value between 0 and 1;
D represents the desirability for energy saving for base station n (discussed in more detail below), normalized to a value between 0 and 1; and
C represents the cost to users of base station n and users of each compensation base station when base station n is compensated for by the one or more compensation base stations of the candidate solution being evaluated (also discussed in more detail below), normalized to a value between 0 and 1.

A weighting may be applied to each factor, L, D, and C, based on the MVO's policy.

The compensation score, Comp, is evaluated as:

$$Comp_n^i = SC_n^i$$

in which,
- n is an identifier for the base station being evaluated for entering compensation mode;
- i is an identifier for the candidate solution being evaluated (as there may be different compensation score for the same base station where there are several different candidate solutions); and
- SC represents the spare capacity of base station n, normalized between 0 and 1 (e.g. based on the total capacity of the base station).

In S203, the energy saving score(s) and compensation score(s) are summed to determine the overall score for the first candidate energy saving solution. The second process then loops back to S201 to evaluate the overall score for the remaining candidate energy saving solutions. The energy saving solution having the greatest overall score is then selected as the energy saving solution to be implemented (S205).

The desirability factor, D, is an evaluation of the benefits to the base station, n, based on the relevant MVO's policy, of entering energy saving mode. To perform this evaluation, the neutral host controller 42 stores, in memory, each MVO's policy for determining the desirability factor, and retrieves the relevant policy when evaluating the desirability factor for a base station. Each policy may be based on one or more the following:
- The base station's measure of energy consumption relative to its energy consumption target; and/or
- An estimate of the energy saved by base station n by entering energy saving mode in combination i, offset by the additional energy required by the one or more base stations entering compensation mode to compensate for the base station entering energy saving mode.

The base station's measure of energy consumption may be based on units of energy or its equivalent in units of carbon dioxide emissions (based on the amount of carbon dioxide emitted for each unit of energy), relative to the MNO's target. The MNO's target may also be a cumulative target, e.g. over a month.

The cost factor represents any cost to users of the base station entering energy saving mode or to users of the one or more compensation base station(s). This may be a cost of degraded service experienced by users when being served by the compensation base station, or a cost incurred by the one of compensation base station(s) in order to compensate for the energy saving base station (such as the resources required to switch to MOCN mode if the energy saving base station and compensation base station are of different mobile network operators). Again, to perform this evaluation, the neutral host controller 42 stores, in memory, each MNO's policy for determining the cost factor, and retrieves the relevant policy when evaluating the cost factor for a base station. Each policy may be based on one or more of the following:
- The services offered by the base station entering energy saving mode;
- The service commitments of the base station entering energy saving mode; and
- The ability for the base station(s) entering compensation mode to compensate for the services offerings/commitments of the base station entering energy saving mode.

The service offerings and commitments may be weighted so as to correlate with the relative cost for not providing a particular service. Service commitments may therefore be given greater weights than service offerings, as there may be more significant penalties for not providing a committed service.

As noted above, there are a plurality of candidate energy saving solutions available for any given arrangement. In the most basic scenario having a first and second base station in which both are potential energy saving base stations, there are at least two candidate energy saving solutions available in which the first base station enters energy saving mode and the second base station enters compensation mode, or the second base station enters energy saving mode and the first base station enters compensation mode. However, there may be many more options that may be evaluated, such as when there is a third base station being evaluated for a switch to energy saving or compensation mode, and/or when each base station serves users according to a plurality of protocols and these services may be independently switched to energy saving or compensation mode, and/or when each base station uses multiple spectrum ranges (multiple "carriers") for independent or aggregated communications and each carrier may be independently switched to energy saving or compensation mode. In scenarios where a base station provides a plurality of access options (e.g. via different protocols or different carriers), the first and second processes may perform their analyses on each of the plurality of access options. That is, the first process may analyze metrics for each access options to determine whether each access options is marked for inclusion in the candidate energy saving solutions and whether each access options is marked for entering energy saving mode, and the second process may analyze a plurality of candidate energy saving solutions in which each access options is acting in either energy saving mode, normal (active) mode, or compensation mode.

Figure 4:
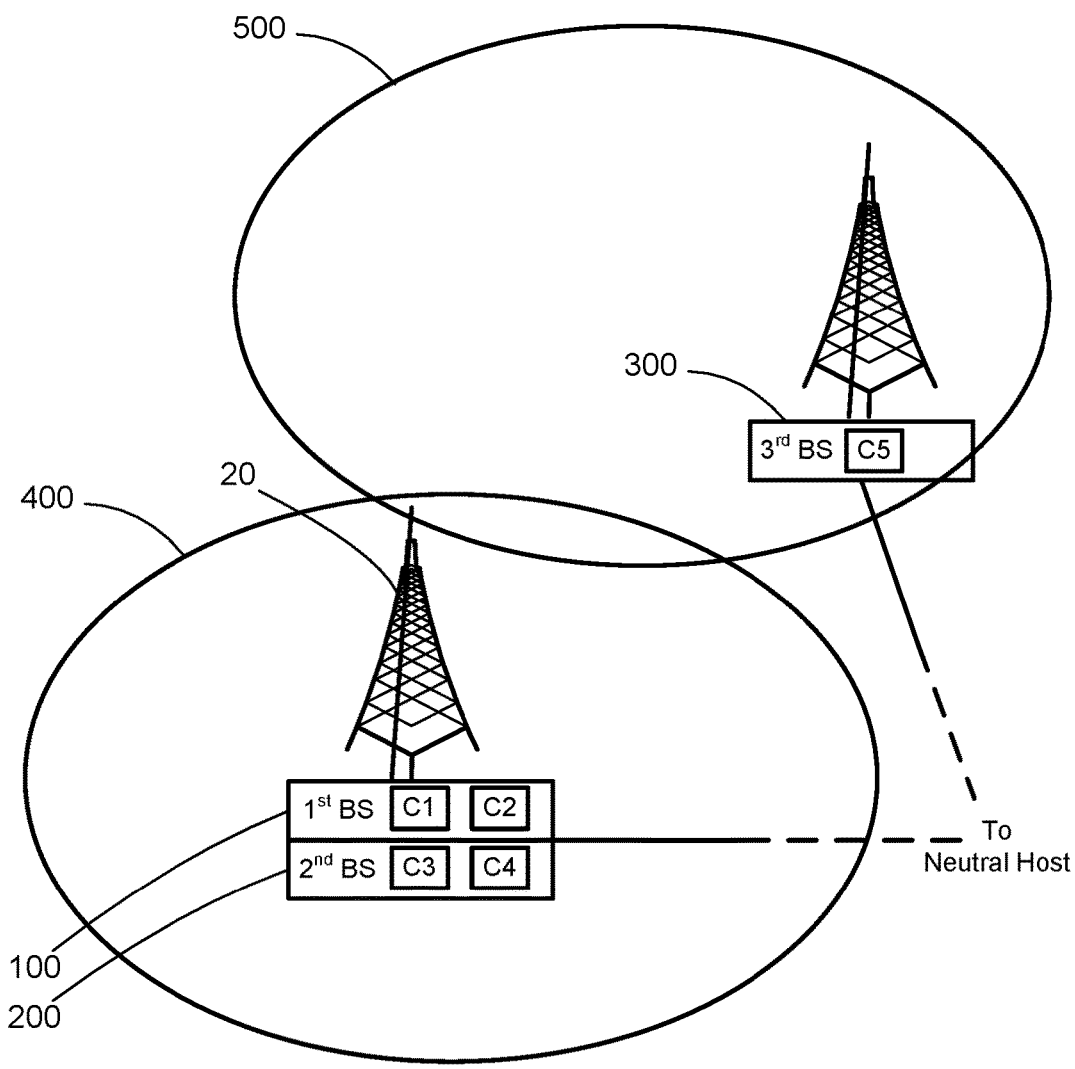
FIG. 4 is a schematic diagram of a cellular telecommunications network implementing the first embodiment of the method of the present disclosure, in a first configuration.

A first embodiment of a method of the present disclosure will now be described with reference to FIGS. 4 to 6. An initial state of the cellular telecommunications network is shown in FIG. 4, in which the cell site includes a first and second base station 100, 200 in a MORAN arrangement, in which the first base station 100 is operated by a first MNO and the second base station 200 is operated by a second MNO. The first base station 100 uses a first and second carrier (C1, C2) and the second base station 200 uses a third and fourth carrier (C3, C4). The first, second, third and fourth carriers are distinct, non-overlapping spectrum ranges for communications with UE in the first coverage area 400. FIG. 4 also illustrates a third base station 300 of another cell site, which is owned and operated by the second MNO. A first coverage area 400 of the first and second base stations 100, 200 and a second coverage area 500 of the third base station 300 is also illustrated. The third base station 300 uses a fifth carrier for communications with UE in the second coverage area 500. The first and second coverage areas 400, 500 only partially overlap in this initial state.

In S301 of this first embodiment, the neutral host controller 42 performs the first process (as described above with reference to FIG. 2). In this embodiment, the first and second carriers of the first base station 100 and the third and fourth carriers of the second base station 100 meet the threshold for inclusion in an energy saving solution and the fifth carrier of the third base station 300 meets the energy saving threshold for becoming an energy saving base station.

In S303 of this first embodiment, the neutral host controller 42 identifies candidate energy saving solutions based on the results of the first process (i.e. that the fifth carrier of the third base station 300 should enter energy saving mode and the first, second, third and fourth carriers of the first and second base stations 100, 200 may (either alone or in any combination) be part of the energy saving solution). As noted above, each energy saving solution may involve one or more carriers of one or more base stations using energy saving mode, normal (active) mode, or compensation mode in an energy saving solution. In this example, the third base station 300 has a single carrier (and therefore will enter energy saving mode in its entirety), but any combination of the first and second carriers of the first base station 100 and third and fourth carriers of the second base station 200 may be in either energy saving mode, normal (active) mode, or compensation mode. This gives a total of 81 candidate energy saving solutions.

In S305, the neutral host controller 42 evaluates the transmission power of the first base station 100 and the transmission power of the second base station 200 in order to compensate for the third base station 300 to identify candidate energy saving solutions that meet a regulatory threshold. As noted above, the respective coverage areas only partially overlap, so that the first and/or second base station 100, 200 must increase their transmission powers for their carriers entering compensation mode in order to increase their coverage areas to cover the third base station's coverage area. If the evaluated transmission power of a candidate energy saving solution for any base station (i.e. those co-located upon a single supporting structure, such as the first and second base station) exceeds a regulatory threshold, then that solution is excluded from further analysis. In this example, this excludes all examples in which one or more carriers enter compensation mode but the remaining carriers remain in active mode. This may be, for example, because the first and second base stations 100, 200 are already transmitting at (or near) their regulatory threshold, so that neither the first or second base station 100, 200 may increase their transmission power for either of their respective carriers in order to increase transmission range. However, if (for example) the first base station 100 switches its first carrier into energy saving mode, then the transmission power of one or more of the first base station's second carrier and the second base station's third and fourth carrier may be increased sufficiently for the respective coverage area to cover the third base station's coverage area 500. In this example, all candidate energy saving options in which at least one carrier is switched to energy saving mode provides sufficient reserve power (i.e. the transmission power required for the first and second base stations 100, 200 when using the remaining carriers only) for either the first and/or second base station to increase the transmission power of the one or more remaining carriers in order to increase its coverage area to cover the third base station's coverage area. These candidate energy saving solutions (having at least one carrier switched to energy saving mode) are therefore not excluded from further analysis.

In S307, the neutral host controller 42 performs the second process (as described above with reference to FIG. 3) in which candidate energy saving solutions are those which are not excluded in S305. The following is noted:

The desirability factor, which represents the desirability for a carrier of a base station to enter energy saving mode, may be greater for carriers that are consuming more energy and/or have consumed more energy according to their MVO's policy relative to other carriers;

The desirability factor may be positively influenced by the amount of energy saved by that carrier entering energy saving mode, and negatively influenced by the amount of additional energy required by other base stations in order to compensate for it. Accordingly, the more carriers that enter energy saving mode (and require compensation) require more energy from the remaining carriers in order to compensate. The MNO policies may therefore favor candidate energy saving solutions which balance the desire for at least one carrier to enter compensation mode to allow another carrier to increase its transmission power and coverage area, with the desire to minimize the number of carriers entering energy saving mode that would then require compensation. In this example, all solutions having only one carrier entering energy saving mode have the greatest desirability factor;

The cost factor is negatively influenced if the carrier compensating for the third base station and/or the carrier of the first/second base station entering energy saving mode cannot provide the same or similar service to the current service offerings and commitments of the base stations (or carriers thereof) entering energy saving mode. In this example, the first carrier of the first base station can provide the same service to the current service offerings and commitments of the third base station 300 and either the third or fourth carrier of the second base station 200, whereas the second carrier of the first base station 100 and third and fourth carriers of the second base station 200 cannot provide the same service of (at least) the third base station's service offerings/commitments.

In this example, the candidate energy saving solution having the greatest overall score is for the third base station 300 and fourth carrier of the second base station 200 to enter energy saving mode, and the first carrier of the first base station 100 to enter compensation mode and compensate for the third base station 300 and fourth carrier of the second base station 200.

In S309, the neutral host controller 42 sends an instruction message to the first base station 100 to cause the first base station 100 to reconfigure so that its first carrier compensates for both the third base station 300 and the fourth carrier of the second base station 200. This includes a switch from the MORAN configuration to a MOCN configuration, in which the first base station 100 begins transmitting the first MNO's Public Land Mobile Network (PLMN) identifier (for transmissions between the first base station 100 and UE of the first MNO) and the second MNO's PLMN (for transmissions between the first base station and UE of the second MNO in order to compensate for the second base station's fourth carrier and the third base station). The first base station 100 also accepts handovers and redirections of all users being served by the second base station's fourth carrier and all users being served by the third base station.

In S311, the neutral host controller 42 reconfigures the neutral host router 44 so that any traffic for the second MVO's users now being served by the first base station 100 is routed between the first base station 100 and the second MVO's core network.

In S313, the neutral host controller 42 sends an instruction message to the second base station 200 to cause the second base station's fourth carrier to enter energy saving mode, and an instruction message to the third base station 300 to cause the third base station 300 to enter energy saving mode. Once the second base station's fourth carrier has entered energy saving mode, then the first carrier of the first base station 100 may increase its transmission power so as to increase its coverage area (this is preferably coordinated to happen before the third base station 300 enters energy saving mode).

Figure 5:
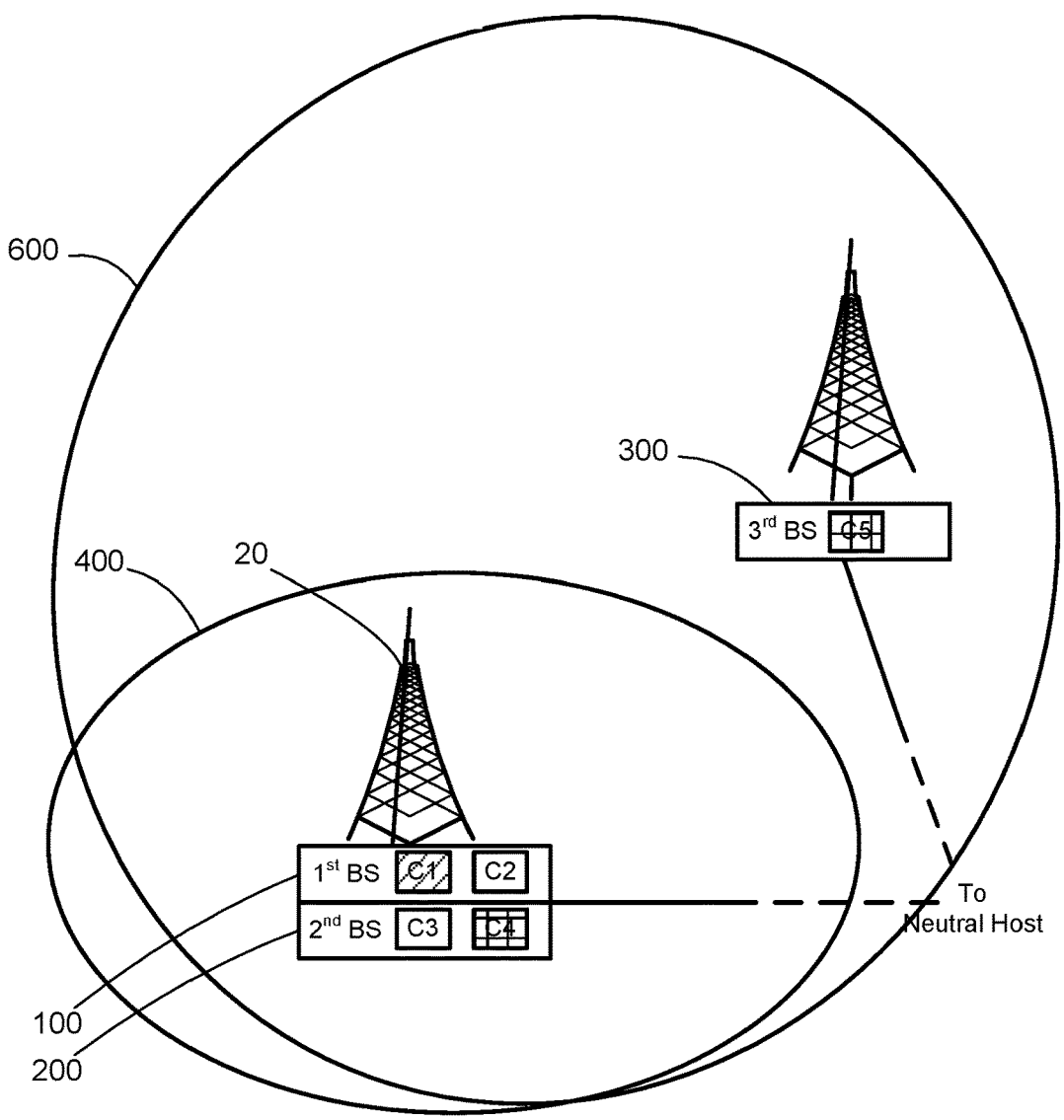
FIG. 5 is a schematic diagram of the cellular telecommunications network of FIG. 4, in a second configuration.
Figure 6:
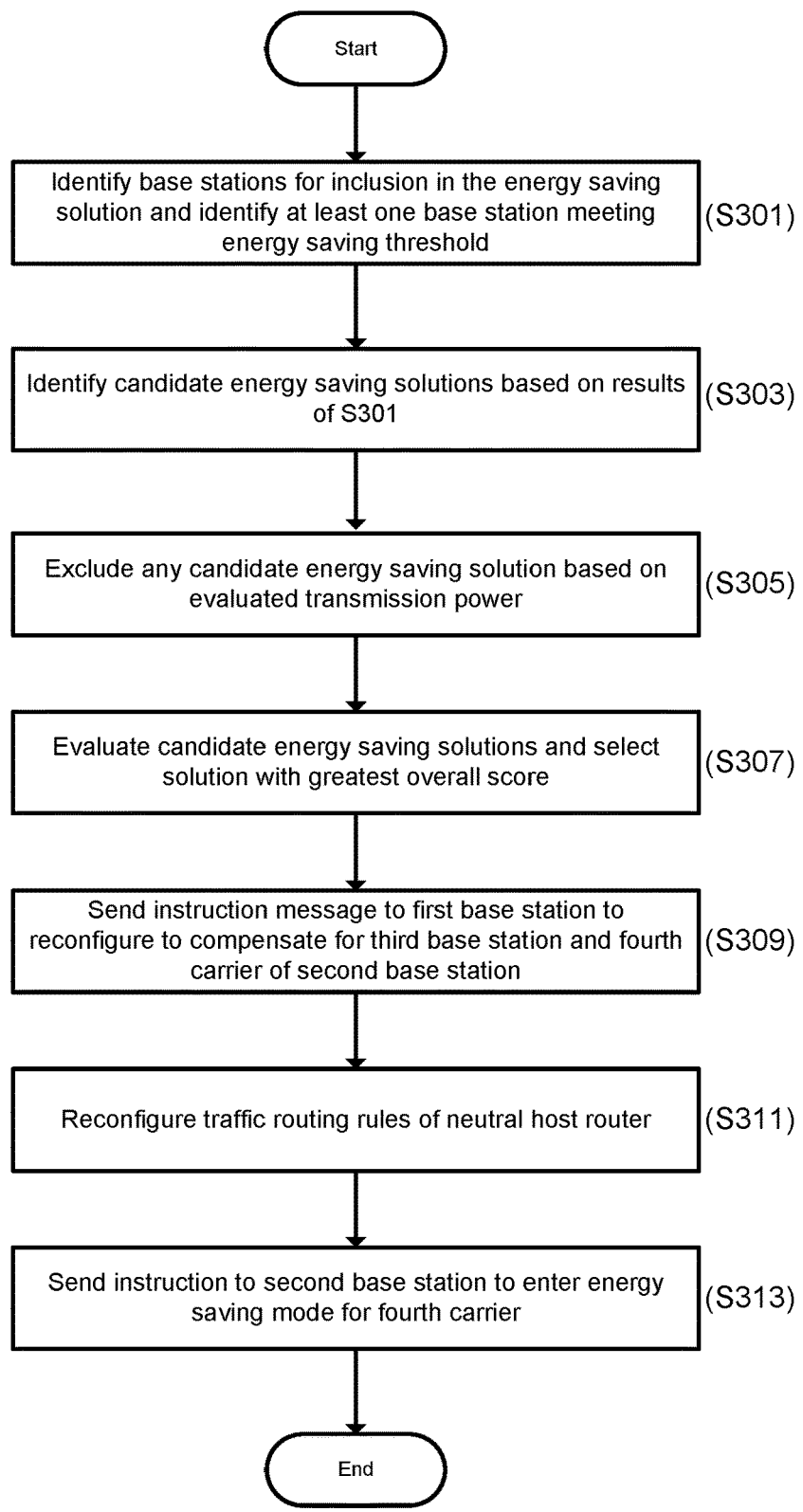
FIG. 6 is a flow diagram illustrating the first embodiment of the method of the present disclosure.

The final state of the cellular telecommunications network is illustrated in FIG. 5, illustrating the same coverage area 400 of the second carrier of the first base station 100 and third carrier of the second base station 200, and the enlarged coverage area 600 of the first carrier of the first base station 100.

This embodiment of the present disclosure therefore provides an energy saving solution for the third base station so that the compensation base station may compensate for the entirety of the third base station's coverage area by switching at least one carrier associated with the compensation base station (i.e. of the same base station or another co-located base station) into energy saving mode. In doing so, the reduction in transmission power for that base station is reduced, so that other carriers associated with that base station may increase their transmission power and corresponding range.

The skilled person will understand that the second base station is non-essential. That is, the first base station 100 may be a multi-carrier base station and switch one carrier into energy saving mode and the other carrier into compensation mode in order to compensate for the third base station. The above embodiment therefore illustrates the flexibility of the second process in identifying a solution from a number of candidate energy saving solutions involving multi-carrier co-located base stations.

In the above embodiment, the compensation base station switches to MOCN mode so as to provide service to an energy saving base station of another MNO. The skilled person will understand that this is non-essential, and the energy saving base station and compensation base station may be of the same MNO. Furthermore, when the compensation base station and energy saving base stations are of different MNOs, the switch to MOCN mode may be based on the compensation base station using (at least a part of) its own exclusive licensed spectrum for that other MNO (e.g. by using the other MNO's PLMN). However, other options are available, such as by using shared licensed spectrum or unlicensed spectrum.

The skilled person will also understand that it is non-essential to perform an initial filtering in which all candidate energy saving solutions that exceed a regulatory threshold are excluded from further analysis. Instead, the MNO's policies may produce a relatively low overall score by having negatively influenced cost factors based on the lack of service across the whole coverage area of the third base station.

The skilled person will also understand that it is non-essential for the first base station to enter energy saving mode. Instead, the first base station may only reduce its transmission power, without fully switching to energy saving mode (which may reduce the transmission power more than is necessary, or unnecessarily handover/redirect UE to neighboring base stations).

In the embodiment above, the third base station 300 is positioned at a different cell site. However, this is non-essential and the base station (or carrier thereof) entering energy saving mode may be positioned at the same cell site (and even be based on the same mast) but have a different coverage area that requires another base station (or carrier of the same base station) to adjust its transmission power in order to compensate. Furthermore, it is non-essential for the base station entering energy saving mode to be compensated for by a base station of another operator (involving a switch to MOCN mode). That is, the compensation base station may be of the same network operator and such a solution may have a reduced overall score due to a reduced cost factor (and the carrier that reduces its transmission power to allow the compensation base station to compensate may be of another mobile network operator). Furthermore, it is non-essential that the transmission power is increased so as to cover the whole coverage area of the base station entering energy saving mode. That is, only a portion of the coverage area may be compensated for.

The skilled person will also understand that the first process may be implemented in the respective base stations, and a message may be sent to the neutral host controller following a trigger condition being met (the base station may also perform its own energy saving solution, such as entering energy saving mode for one of its services, before notifying the neutral host for a network-wide response).

The skilled person will also understand that the second process detailed above (as shown in FIG. 3) is exemplary and other processes may be implemented in which one or more carriers in a multi-carrier co-located base station enter energy saving mode in order for another carrier of the multi-carrier co-located base station to modify its coverage in order to compensate for another base station entering energy saving mode. Furthermore, in this second process, the energy saving score and compensation score may be calculated for groups of base stations (e.g. a single energy saving score for all base stations entering energy saving mode and a single compensation score for all base stations entering compensation mode).

In all embodiments detailed above, there may be a subsequent decision for the base stations to end energy saving mode and switch back to active mode. This may be based on the same triggers used in the first process, or based on independent triggers. Once the base station(s) have returned to active mode, users may be transferred back to the active mode base station, and the compensation mode base station may return to active mode. The neutral host controller and router may also be reconfigured to route user traffic via the user's serving base stations.

Furthermore, the above embodiments may be performed in an iterative manner so that a new energy saving solution may be determined as the most suitable, and the neutral host controller may instruct the relevant base stations to switch to this new energy saving solution.

The skilled person will also understand that it is non-essential for the various processes described above to be performed on the neutral host controller. That is, any entity in the cellular telecommunications network could implement the above processes, and would typically be supported by a sharing arrangement between the operators.

In the embodiments above, a base station may be required to reconfigure. Typically, a reconfiguration requires the base station to reboot, such that users lose service. Therefore, in an enhancement, such service interruption may be avoided by utilizing a multi-carrier base station. For example, users of a multi-carrier base station may be transferred between carriers so that one carrier is an unused carrier, and this unused carrier may be reconfigured to MOCN mode so that it may serve users of both its own operator and the operator of the base station to be reconfigured. Users of the base station to be reconfigured may then be transferred to the unused carrier of the multi-carrier base station, so that the base station to be reconfigured can be reconfigured without any service interruption to the users it previously served or to users of the multi-carrier base station. Furthermore, in the embodiments above where there are multiple candidate solutions, a negative impact to users during the transition from the network's current state to its final state may be analyzed as part of the selection process.

The skilled person will understand that any combination of features is possible within the scope of the disclosure, as claimed.

The invention claimed is:

1. A method of operating a network node in a cellular telecommunications network, wherein the cellular telecommunications network includes a first transceiver providing a first access connection, a second transceiver providing a second access connection, and a third transceiver providing a third access connection, wherein the first transceiver and the second transceiver are co-located, the method comprising:
determining that the third transceiver should enter energy saving mode;
in response to the determining:
causing reconfiguration of the first transceiver to reduce a transmit power of the first transceiver so as to generate reserve power for the second transceiver co-located with the first transceiver, and
causing reconfiguration of the second transceiver so as to increase a transmit power of the second access connection, using the reserve power, to enable the second access connection to compensate for the third transceiver.

2. The method as claimed in claim 1, wherein, in response to the determining, the method further comprises:
evaluating a plurality of candidate energy saving solutions based on one or more of: a measure of a load of at least one of the first transceiver, the second transceiver, or the third transceiver, a measure of capacity of at least one of the first transceiver, the second transceiver, or the third transceiver, a measure of energy saved by at least one of the first transceiver, the second transceiver, or the third transceiver entering energy saving mode, and a measure of additional energy consumed for at least one of the first transceiver or the second transceiver to compensate for the third transceiver; and
selecting a candidate energy saving solution based on the evaluating,
wherein causing reconfiguration of the first transceiver and causing reconfiguration of the second transceiver are based on the selected candidate energy saving solution.

3. The method as claimed in claim 2, further comprising:
determining the transmit power of the first transceiver and the second transceiver for each candidate energy saving solution; and
excluding a candidate energy saving solution from the evaluation where the transmit power of the first transceiver and the second transceiver exceeds a maximum allowable transmit power.

4. The method as claimed in claim 1, further comprising:
causing reconfiguration of the second transceiver so as to compensate for the first transceiver.

5. The method as claimed in claim 4, wherein the second access connection is for a first mobile network operator and the third access connection is for a second mobile network operator, and the method further comprises:
causing reconfiguration of the second access connection to be for the first mobile network operator and the second mobile network operator.

6. The method as claimed in claim 5, wherein the first access connection is for the second mobile network operator.

7. The method as claimed in claim 1, wherein the second access connection is for a first mobile network operator and the third access connection is for the first mobile network operator.

8. The method as claimed in claim 1, implemented on a neutral host controller.

9. The method as claimed in claim 1, further comprising, initially:
the cellular telecommunications network meeting at least one condition for triggering an energy saving solution.

10. The method as claimed in claim 9, wherein the at least one condition includes at least one of:
a measure of load in at least one of the first transceiver, the second transceiver, or the third transceiver, or
a measure of energy consumption of at least one of the first transceiver, the second transceiver, or the third transceiver.

11. A non-transitory computer-readable storage medium storing a computer program comprising instructions which, when the computer program is executed by a computer, cause the computer to carry out the method of claim 1.

12. A system comprising:
at least one processor and memory configured to carry out the method of claim 1.

13. A network node having a processor configured to carry out the method of claim 1.

* * * * *